United States Patent [19]

Witt

[11] Patent Number: 4,844,135

[45] Date of Patent: Jul. 4, 1989

[54] PANEL ROUTING METHOD AND MEANS

[76] Inventor: Bradley R. Witt, 5323 W. Kimberly Rd., Davenport, Iowa 52806

[21] Appl. No.: 261,716

[22] Filed: Oct. 24, 1988

[51] Int. Cl.⁴ .............................................. B27M 1/00
[52] U.S. Cl. ................................ 144/371; 144/134 A; 144/137; 144/253 J; 144/218; 144/240; 409/130; 409/182
[58] Field of Search ................. 144/85, 114 R, 134 R, 144/134 A, 137, 150, 198 R, 218, 219, 220, 224, 225, 240, 251 R, 253 R, 253 J, 251 A, 278 R, 371; 409/130, 182

[56] References Cited

U.S. PATENT DOCUMENTS

| 11,407 | 8/1854 | Bauersfeld | 144/219 |
|---|---|---|---|
| 120,405 | 10/1871 | Walker | |
| 1,576,645 | 3/1926 | Eskew et al. | 144/115 |
| 2,965,144 | 12/1960 | Lowenthal | 144/219 |

FOREIGN PATENT DOCUMENTS 846790 8/1952 Fed. Rep. of Germany ... 144/134 A

OTHER PUBLICATIONS

Routers, Jigs & Techniques, Sterling Publishing Co., Inc., N.Y., p. 57, illustration 81.

Primary Examiner—W. Donald Bray
Attorney, Agent, or Firm—Pearne, Gordon, McCoy & Granger

[57] ABSTRACT

Panel raising is accomplished with an elongate router cutter tool working against a workpiece or panel which is supported edgewise on the working surface of a work table.

8 Claims, 1 Drawing Sheet

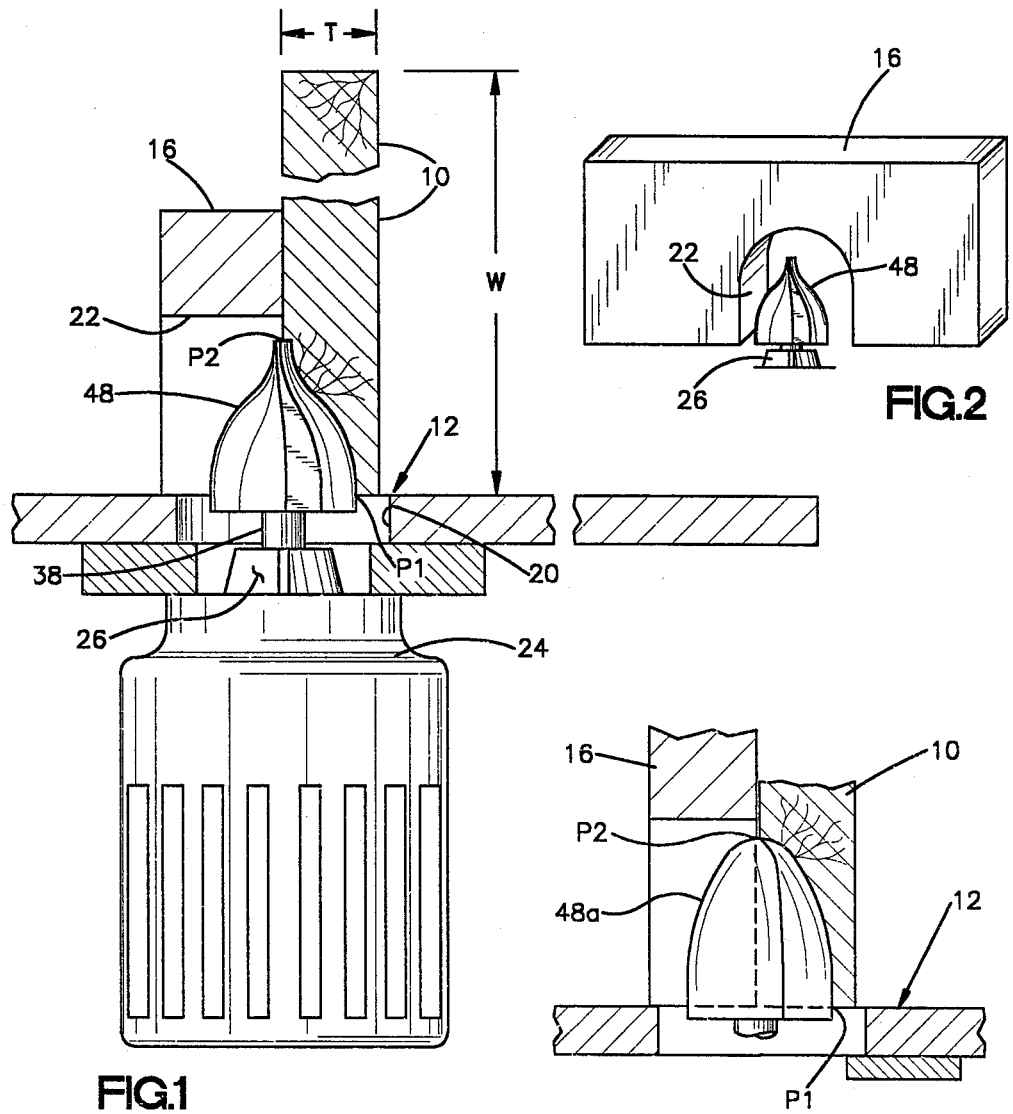
FIG.1
FIG.2
FIG.1A
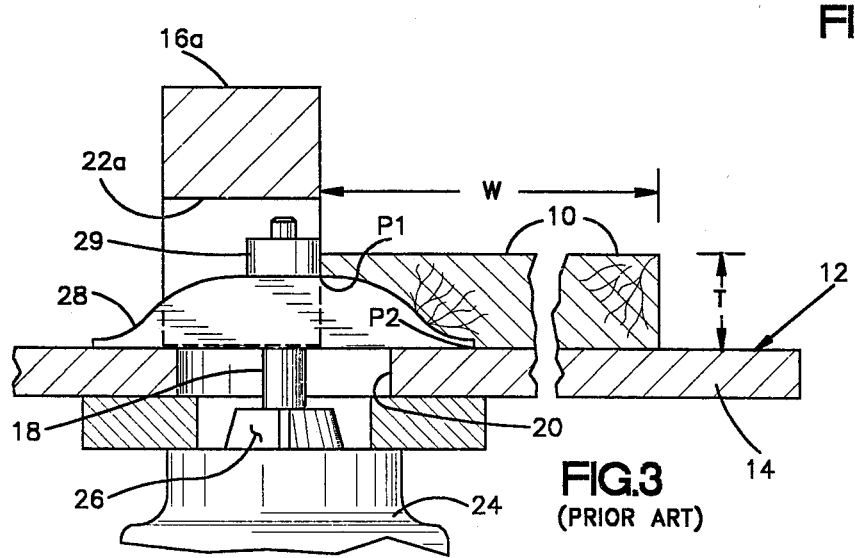
FIG.3
(PRIOR ART)

PANEL ROUTING METHOD AND MEANS

BACKGROUND OF THE INVENTION

This invention relates to panel raising, and particularly to the manufacture in small cabinet shops and the like of raised panels and similar pieces by means of routing as an economical alternative to use of a shaper.

PRIOR ART

Raising a panel is a way to give a rich panelled effect to an otherwise starkly rectangular board and, if desired, to render it mountable in the styles of a frame, by shaping the cross sections of the board edges to give the effect of a raised central panel surrounded by a border of relatively thin dimension. The cross-sectional pattern of the edge of a raised panel typically has a ogee (S-shaped) configuration, or alternatively a smooth concavity whose radius decreases toward the center of the panel, although other shapes may be employed.

For reasons of economy related to scale, routing rather than shaping has long been used by the home hobbyist and a small cabinet shop operator for raising panels and similar pieces. The present invention is an improvement in methods of using router tools rather than shaping tools to shape panel board edges.

In prior art use of router tools rather than shaping tools to shape panel board edges, the economy of routing rather than shaping when operating on a small scale was indeed realized. However, since the cross-sectional pattern of the raising cut typically extends across the length or width of the panel further than it does across the thickness of the panel, the practice was to use vertically spindled upwardly directed router bits whose working profiles were typically much wider than their height. This in turn dictated the use of wide, squat bit shapes. The relatively great width of such bits corresponded to tip speeds of say about 26,000 feet per minute, speeds which, if not unsafe, were at least perceived by users to be undesirable from a safety standpoint, thereby limiting sale and use of router tools for raising panels.

Furthermore, the width of the router tools of the prior art, typically 3½ inches 988.9 mm), often required special large-diameter insert plates or adapters be used on the router table.

SUMMARY OF THE INVENTION

The present invention realizes the advantages of using routing tools rather than shaping tools to shape panel board edges, but in a manner and with tools and set-ups that involve much slower tip speeds of the router bit than the prior art, resulting in greatly reduced tip speeds as compared to the prior art, reductions to say about 7600 feet per minute. With such greatly reduced tip speeds, the present invention provides a routing means and method whose perceived safety is much greater than that of the prior art.

Furthermore, the invention enables the use of a router table having only a standard or relatively small opening for the router tool. There is no need for special large-diameter insert plates or adapters.

Still further, the invention makes possible adjustment of the profile cut by a router tool, so that the profile may be readily set anywhere between say 1 inch to 1½ inches (25.4 mm and 38.1 mm) of reveal by simply raising or lowering the tool in the router chuck.

These benefits are accomplished with an upwardly directed vertically spindled tool that is fully compatible with use of a conventional routing table. Such a table easily can be set up to practice the invention without the necessity for any special table modifications. Furthermore the tool may be manufactured substantially as economically, or even more economically, than the wide, squat bit shapes employed in prior art methods.

Consequently, the perceived safety advantages of the present invention are provided at substantially no greater cost than is associated with the practices of the prior art. Therefore, in the practice of the invention, the economic advantage of using routing tools rather than shaping tools is realized as fully as in the practices of the prior art but with greater perceived safety, and without the need for special insert plates or adapters, and with the further advantage of ready adjustability of the degree of extension of the profile across the reveal.

The advantages and features of the invention will be more fully understood from the following detailed description of one example.

DETAILED DESCRIPTION OF THE DRAWINGS

In the drawings,

FIG. 1 is a schematic cross sectional view, partly broken away, illustrating one embodiment of the practice of the invention.

FIG. 1A is a view similar to the center part of FIG. 1 showing an alternative cutter.

FIG. 2 is an isometric view on a smaller scale showing the cutter and fence of FIG. 1 from another viewpoint.

FIG. 3 is a view similar to FIG. 1 illustrating a typical practice of the prior art.

DETAILED DESCRIPTION OF THE INVENTION

In order that the invention may be most readily described and understood, there will first be described the conventional practice of the prior art upon which the invention improves. Typical prior art methodology in panel raising by use of a router bit is illustrated in FIG. 3. A workpiece or wood panel 10 is supported on the working surface 12 of a worktable 14. The workpiece slides along the working surface and is guided in its sliding movement by guide means such as the guide fence 16a which has a cut-out or opening 22a to receive a tool. A tool shank 18 projects upwardly through an opening 20 in the worktable 14. The tool shank is powered by the motor 24 which is mounted beneath the worktable. The shank is removably received in a motor chuck 26 as shown.

In the illustrated typical practice of the prior art, the tool shank forms part of a tool comprising a wide squat router bit or cutter 28. The cutter is deployed immediately adjacent the working surface 12 and projects above it. The cross-sectional pattern to be cut is defined by the profile between the endpoints P1 and P2 shown in FIG. 3, such profile being the silhouette of the surface of revolution generated by that portion of the cutter that contacts the workpiece. As is typical, and as can be seen in FIG. 3, the cross-sectional pattern or profile P1—P2 extends across the width W of the workpiece 10 (i.e., across the reveal) further than it does across the thickness T of the workpiece. In this typical priorart example, the tool includes a ball-bearing pilot 29 which rolls against the unworked portion of the edge of the workpiece from which material is being removed.

While often satisfactory results may be obtained by the conventional panel-raising method illustrated, the radius of the cutter 28 is relatively great, and at typical motor speeds, the tips of the cutter travel at, say 26,000 feet per minute. As previously indicated, operation of a tool at such tip speed, if not unsafe, is at least perceived by users to be undesirable from a safety standpoint, thereby limiting sale and use of such tools. Also, special adaption of the router table may be required to accommodate the wide tool.

According to the present invention, the practice of the prior art just described is replaced by providing an elongate cutter tool which has a working profile with a relatively long longitudinal dimension and a relatively short radial dimension, as illustrated in FIG. 1. In FIG. 1, elements like those already described in the foregoing description of FIG. 2 are given the same reference numerals, and unlike elements are given different reference numerals.

Thus in practicing the invention, and as shown in FIG. 1, there may be provided the same worktable 14 having working surface 12, and a guide fence 16 differing from the guide fence 16a only in that the cut-out or opening 22 may be of smaller longitudinal extent than the opening 22a and must be higher than the opening 22a in order to accommodate a different shape of tool, and the fence must be of sufficient height to support an on-edge workpiece. (However, if the opening in a prior art guide fence happens to be large enough to accommodate the tool shapes of the invention as well as those of the prior art, and if the fence is also of adequate height, such fence can be used in the practice of the invention with no change whatsoever.)

Again, the tool may be driven by a motor 24 provided with a suitable chuck 26 to receive the tool shank which extends upwardly though the opening 20 in the worktable. This identity between much of the equipment usable in the practice of the present invention and that used in the prior art for raising panels by routing means that the advantages of the invention are realized at substantially no increased cost over the practices of the prior art.

The practice of the invention differs from the prior art in the use of an elongate router cutter tool such as the tool 48 shown in FIG. 1, in the positioning and supporting of the workpiece or panel 10 edgewise on the working surface 12, and in other respects described below.

As can be seen in FIG. 1, the elongate router cutter tool 48 is combined in one piece, and with its own integral shank 38 mounted in the motor chuck 26. The length of the shank (the total extent of which is not shown in the drawings) is at least half as long as the tool proper and is preferably approximately equal to the length of the tool proper. The working profile of the cutter tool in FIG. 1 is shown to have an ogee (S-shaped) configuration, since this is a commonly used profile shape in panel raising and, for purposes of comparison, such working profile is also shown to be the same as the profile of the prior-art tool 28 shown in FIG. 3. Another cutter tool 48a which may be used in the practice of the invention is shown in FIG. 1A. This tool has a working profile which defines in the workpiece a smooth concavity. These working profiles of the tools 48 and 48a are typical of those used for panel raising in that the slope of the profile, with respect to the tool axis, is unidirectional generally throughout the length of the profile. Thus, in both illustrated working profiles, the slope of the profile between points P1 and P2 is non-negative generally along the entire length or axial extent of the working profile. Such characteristic would be also true of other typical working profile shapes used in panel raising.

Points P1 and P2 in FIG. 1 are spaced from each other identically to points P1 and P2 in FIG. 3 for comparison of the invention with the prior art with respect to an identical profile. However, the actual working profile may be readily adjusted in the extent to which it extends across the reveal (i.e. across the W direction) by simply raising or lowering the shank 38 in the chuck 26. If the shank is raised from the illustrated position to the point that the bottom corner or skirt of the tool 48 is level with the working surface 12 of the worktable, the total working profile of the tool is employed. As the shank 38 is adjusted to lower and lower positions in the chunk, the total working profile of the tool is no longer employed, and the actual working profile of the set-up is progressively reduced. This adjustment may extend throughout a range of say ½ inch (12.7 mm) to thereby correspondingly adjust the profile cut by the tool to any desired setting within that range.

The total working profile of each of the tools 48 and 48a has a relatively long longitudinal dimension and a relatively short radial dimension, and each of these tools is vertically spindled so as to position a substantial portion of its total working profile above the working surface 12 (to thereby define the actual working profile), with the working profile of the tool extending upwardly to the free end of the tool at a height above the working surface greater than the thickness T of the workpiece.

It is to be noted that each of the resulting tools has a total working profile whose slope, with respect to the tool axis, is unidirectional generally throughout the length of the tool, and a profile that is longer in the axial direction than the diameter of the working end of the tool. Typical height dimensions of the total working profile are from about 1.75 to 3 inches (44.5 mm to 76.2 mm). Typical major radii are from about 0.4 to 0.75 inches (10.2 to 9.0 mm). Router bit tools combining these dimensions and shapes are believed to be novel.

Again, the cross-sectional pattern to be cut is defined by the profile between the endpoints P1 and P2, such profile being the silhouette of the surface of revolution generated by that portion of the cutter that contacts the workpiece. However, the relatively long longitudinal dimension of the vertically spindled cutter tool 48 of FIG. 1 or 48a of FIG. 1A extends the cross-sectional pattern between the points P1 and P2 predominately in the vertical direction across the width W of the on-edge workpiece 10. This is in marked contrast to the prior art as seen in FIG. 3, in which the cross-sectional pattern or profile P1-P2 extends predominately in the horizontal direction across the width W of the face-down workpiece 10.

The predominately vertical orientation of the cross-sectional pattern makes possible the utilization of a vertically elongate cutter such as cutter 48 whose relatively small radial dimension correlates with relatively low tip speeds and the advantages attendant thereon.

As seen in FIGS. 1 and 1A, the cutter tool proper of each cutter tool 48, 48a has a center of gravity toward its shank end so that its free end is of relatively low mass as compared to its shank end whereby it has an elongate shape and still has sufficiently low free end dynamic flexure to hold acceptable cutting tolerances throughout its length including its free end. This low free-end dynamic flexure is exploited as shown in FIGS. 1 and 1A by positioning a substantial portion of the total working profile including the free end of the tool above the horizontal worktable surface 12 with the vertical distance of the free end of the tool above the worktable surface approaching the full elongate extent of the cutter-tool proper and exceeding the major outside diameter of the cutter-tool proper to thereby, consistently with acceptable cutting tolerances, define a cross-sectional pattern that extends across the length or width of a panel further than the cross-sectional pattern is to extend across the thickness of the panel.

In the foregoing description, terms such as "vertically," "horizontally," and "above" are used because it is common practice to use a vertical tool spindle and a horizontal work surface. However it is to be understood that these terms are used in the following claims in a broad and relative sense so as to apply, for example, to methods practiced on the set-up illustrated in FIG. 1 even if that set-up were for example rotated forty-five or ninety degrees in the counterclockwise direction, at which new positions the set-up would still be operative.

The invention is not limited to the specific details of the illustrated example, but is defined by the following claims.

What is claimed is:

1. A method for routing an edge of a wood panel in a cross-sectional pattern that extends across the length or width of the panel further than said cross-sectional pattern extends across the thickness of the panel comprising: providing an elongate one-piece router cutter-tool comprising a cutter-tool proper and a shank for said cutter-tool proper, said cutter-tool proper having a total working profile with a relatively long longitudinal dimension and a relatively short radial dimension whereby cutter-tip speeds may be minimized, said total working profile being of a slope, with respect to the tool axis, that is unidirectional generally throughout the length of the profile, the direction of said unidirectional slope being such that said working profile becomes progressively closer to the tool axis as said working profile extends towards the free end of said elongate one-piece cutter-tool and said working profile approaches perpendicularity to said tool axis at the tip of said tool to thereby define a desired panel-raising pattern whose inner border is marked by a definite relief and also to define a one-piece cutter-tool proper whose center of gravity is toward its shank end so that said free end of said one-piece cutter-tool proper is of relatively low mass as compared to said shank end whereby said cutter-tool proper can have its said elongate shape and still have sufficiently low free-end dynamic flexure to hold acceptable cutting tolerances throughout its length including its free end, said elongate one-piece cutter-tool being vertically spindled and said low free-end dynamic flexure being exploited by positioning a substantial portion of said total working profile and the free end of said cutter-tool above a horizontal worktable surface with the vertical distance of said free end of said cutter-tool above said worktable surface approaching the full elongate extent of said cutter-tool proper and exceeding the major outside diameter of said cutter-tool proper to thereby, consistently with acceptable cutting tolerances, define said cross-sectional pattern that is to extend across the length or width of the panel further than said cross-sectional pattern is to extend across the thickness of the panel, providing workpiece guide means in association with said worktable surface, powering the one-piece elongate cutter-tool, positioning and movably supporting a workpiece panel edgewise on the worktable surface and facewise against said guide means, and moving the workpiece panel along the guide means and the worktable surface in guided relationship therewith and with the said elongate one-piece cutter-tool in cutting relationship with the workpiece and with no other cutter tool in contact with a workpiece.

2. A one-piece elongate router cutter-tool having a given total working profile, said tool being adapted to be vertically spindled and upwardly directed so as to project said total working profile of the tool upwardly beyond the working surface of a worktable to a location of maximum height at the free end of the mounted tool, said total working profile of said elongate cuttertool having a relatively long longitudinal dimension of between about 1.75 and 3 inches (44.5 mm to 76.2 mm) and a relatively short radial dimension of from about 0.4 to 0.75 inches (10.2 to 19.0 mm), said elongate cutter-tool having a shank that is coaxial with the tool proper and which extends downward therefrom and whose length is at least half the length of the tool proper, said shank and all parts of said tool proper being integral with each other, said total working profile being of greater longitudinal extent than the major diameter of the working end of the tool, and said total working profile being of a slope, with respect to the tool axis, that is unidirectional generally throughout the length of the profile, the direction of said unidirectional shape being such that said working profile becomes closer to the tool axis as said working profile extends toward the free end of said tool, said working profile approaching perpendicularity to said tool axis at the tip of said tool.

3. A method for routing an edge of a wood panel in a cross-sectional pattern that extends across the length or width of the panel further than said cross-sectional pattern extends across the thickness of the panel comprising: providing an elongate router cutter-tool comprising a cutter-tool proper and a shank for said cutter-tool proper, all elements of said cutter-tool proper being integral with the others, said cutter-tool proper having a total working profile with a relatively long longitudinal dimension and a relatively short radial dimension whereby cutter-tip speeds may be minimized, said total working profile being of a slope, with respect to the tool axis, whose direction generally throughout the length of the profile does not reverse, the direction of said slope being such that said working profile becomes closer to the tool axis as said working profile extends towards the free end of said elongate cutter-tool and said working profile approaches perpendicularity to said tool axis at the tip of said tool to thereby define a desired panel-raising pattern whose inner border is marked by a definite relief and also to define a cutter-tool proper whose center of gravity is toward its shank end, said elongate one-piece cutter-tool being vertically spindled with a substantial portion of said total working profile and the free end of said cutter-tool positioned above a horizontal worktable surface with the vertical distance of said free end of said cutter-tool above said worktable surface approaching the full vertical extent of said working profile and exceeding the major outside diameter of said cutter-tool proper to thereby define said cross-sectional pattern that is to extend across the length or width of the panel further than said cross-sectional pattern is to extend across the thickness of the panel, providing workpiece guide means in association with said worktable surface, powering the one-piece elongate cutter-tool, positioning and movably supporting a workpiece panel edgewise on the worktable surface and facewise against said guide means, and moving the workpiece panel along the guide means and the worktable surface in guided relationship therewith and with the said elongate cutter-tool in cutting relationship with the workpiece and with no other cutter tool in contact with the workpiece.

4. A method as defined in claim 3 in which said step of providing an elongate router cutter-tool is further characterized by the provision of a cutter-tool whose working profile approaches perpendicularity to said tool axis at the tip of said tool to thereby define a desired panel-raising pattern whose inner border is marked by a definite relief.

5. An elongate router cutter-tool having a given total working profile, said tool being adapted to be vertically spindled and upwardly directed so as to project said total working profile of the tool upwardly beyond the working surface of a worktable to a location of maximum height at the free end of the mounted tool, said total working profile of said elongate cutter-tool having a relatively long longitudinal dimension of between about 1.75 and 3 inches (44.5 mm to 76.2 mm) and a relatively short radial dimension of from about 0.4 to 0.75 inches (10.2 to 19.0 mm), said elongate cutter-tool having a shank that is coaxial with the tool proper and which extends downward therefrom, all parts of said tool proper being integral with each other, said total working profile being of greater longitudinal extent than the major diameter of the working end of the tool, and said total working profile being of a slope, with respect to the tool axis, whose direction generally throughout the length of the profile does not reverse, the direction of said slope being such that said working profile becomes closer to the tool axis as said working profile extends toward the free end of said tool.

6. A tool as in claim 5 in which said working profile approaches perpendicularity to said tool axis at the tip of said tool.

7. A tool as in claim 5 in which said shank extends downward from the tool proper a distance at least half the length of the tool proper.

8. A tool as in claim 6 in which said shank extends downward from the tool proper a distance at least half the length of the tool proper.

* * * * *

UNITED STATES PATENT AND TRADEMARK OFFICE
CERTIFICATE OF CORRECTION

PATENT NO. : 4,844,135
DATED : July 4, 1989
INVENTOR(S) : Bradley R. Witt It is certified that error appears in the above-identified patent and that said Letters Patent is hereby corrected as shown below:

Column 1, line 45, "988.9 mm)" should be --(88.9 mm)--.

Column 2, line 67, "priorart" should be --prior-art--.

Column 3, line 6, after "say" insert --,--.

Column 4, line 20, "chunk" should be --chuck--.

Column 4, line 43, "9.0" should be --19.0--.

Column 6, line 10, "a" should be --the--.

Column 6, line 17, "cuttertool" should be --cutter-tool--.

Signed and Sealed this

Fifteenth Day of May, 1990

*Attest:*

HARRY F. MANBECK, JR.

*Attesting Officer*  *Commissioner of Patents and Trademarks*